June 22, 1926.

N. E. SHARPNECK

SAFETY DRAINER

Filed April 20, 1925

INVENTOR
NELLIE E. SHARPNECK

By
E. L. Sharpneck.
Atty.

Patented June 22, 1926.

1,589,486

UNITED STATES PATENT OFFICE.

NELLIE E. SHARPNECK, OF EAST BAKERSFIELD, CALIFORNIA.

SAFETY DRAINER.

Application filed April 20, 1925. Serial No. 24,592.

This invention relates to safety drainers and more particularly to a safety drainer adapted for use in connection with stewpans, sauce-pans, or the like, for the purpose of draining or straining the water or cooking fluid from the vegetables, fruit, or other articles that have been or are being cooked within the said stew-pan or sauce-pan, and which safety drainer may be positioned over the stew-pan, sauce-pan, or the like, when it is desired to strain or drain the liquid from the sauce-pan or stew-pan, without necessitating one's placing his hand immediately over the pan, whereby the said individual is enabled to drain the cooking liquid from the pan without danger of burning or scalding himself.

In the cooking of vegetables, fruit or the like for example, in the boiling of potatoes in a pan; after the potatoes have been boiled, and it is desired to drain the boiling water from the cooked potatoes, it has heretofore for a great many years been necessary to take a cover and place the same over the upper rim or edge of the pan so as to leave an opening from which the water could be drained and this placing of the cover over the pan has necessitated the individual desiring to drain the said boiling water holding the cover at approximately the center thereof in position over the top of the pan which has resulted, in many instances, in the scalding or burning of the individual, due to the steam generated by the boiling water after the same is poured from the pan into relatively cold atmosphere. While in some instances drainage covers may have been provided which have small drainage openings over the spout of the pan, or the like, these covers have been, for the most part, of expensive construction and have not gone into extensive production, principally because of the expense thereof.

It is therefore an object of this invention to provide a safety drainage cover that may be easily positioned over the top of a pan without necessitating the individual, placing the same, putting his hand over the pan, and which cover, when positioned, may be easily clamped to the pan at the handle of the pan, and which safety drainage cover is of extremely simple construction and inexpensive, and which cover when so positioned will be clamped to the pan so that the same may be completely or partially inverted to drain the cooking or boiling liquid from the article or articles being cooked within the pan.

Another object of this invention is to provide a safety drainage cover which can be quickly attached to a pan by a simple clamp that will hold the safety drainage cover securely in position without danger of the same slipping from position irrespective of the position to which the pan is turned.

Other objects and advantages of this invention will be apparent from the following detailed description of a preferred embodiment thereof, as illustrated in the accompanying drawings, in which drawings.

Figure 4:
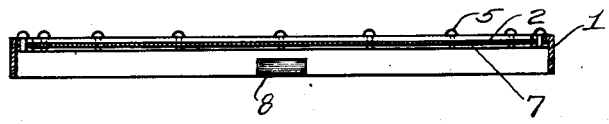
Figure 4 is a vertical section, taken substantially on the line A of Figure 1.
Figure 3:
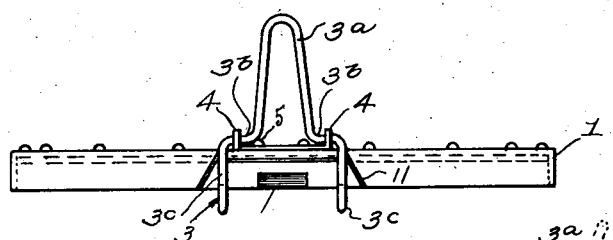
Figure 3 is a rear elevation, illustrating the cut-away portion of the angular frame employed in the construction of the said safety drainage device and the clamping means provided.
Figure 2:
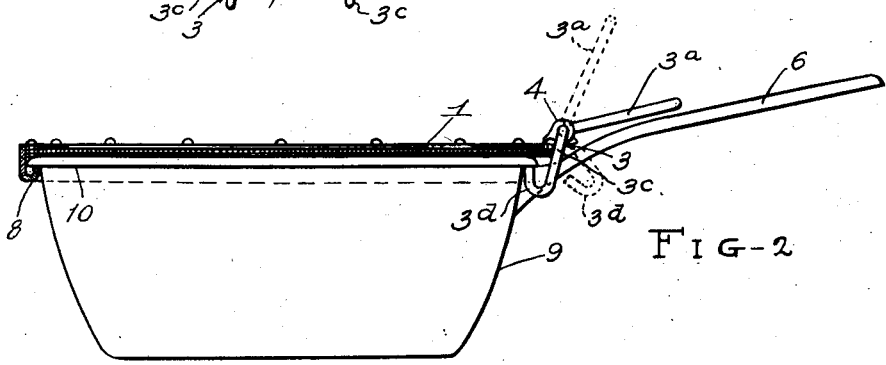
Figure 2 is a side elevation thereof, illustrating the safety drainer in vertical section, taken substantially on the line B of Figure 1.
Figure 1:
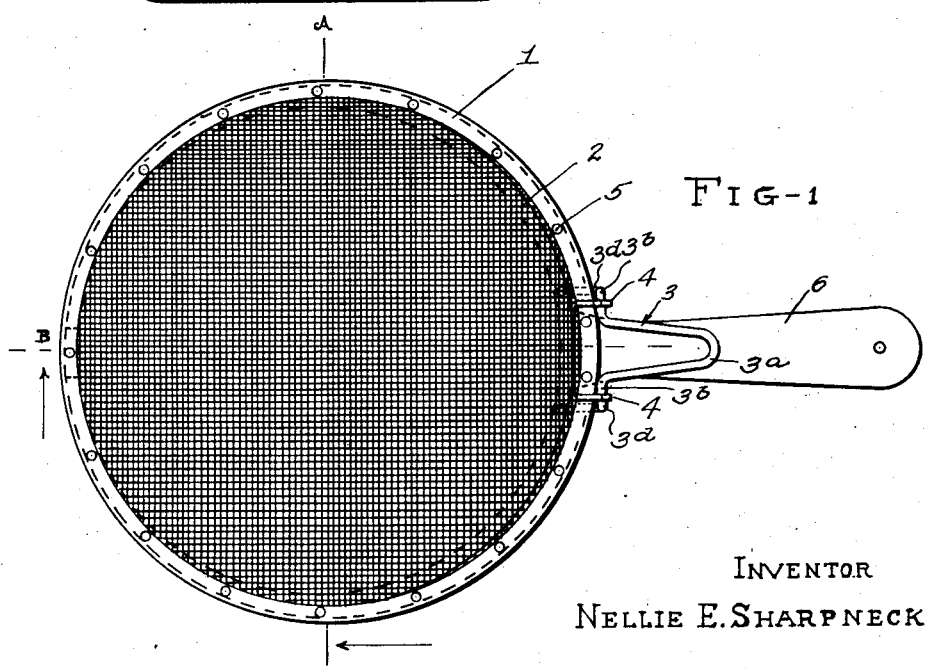
Figure 1 is a top plan view of a safety drainer embodying this invention, illustrating the same as secured to and in position on a pan.

In the preferred embodiment of this invention illustrated in the accompanying drawings, 9 illustrates a pan having at its upper edge an outwardly extending lip or rim 10 and having a handle 6 secured thereto.

The safety drainer herein illustrated preferably comprises an angular frame 1 constructed of a thin portion of material, such as tin or the like, and is formed to correspond to the curvature of the upper edge or rim 10 of the pan 9. The frame 1 is of slightly greater diameter than the outside diameter of the rim 10 of the pan 9. An annular portion of wire screen 2, such as is used in making strainers or the like, is secured to the angular frame 1 by any desirable or preferred means and I have herein illustrated the said screen 2 as being secured to the angular frame 1 by means of a plurality of spaced rivets 5 which pass through the upwardly inwardly extending portion of the angular frame 1 and through the screen 2 and through an annular rim or washer 7 which is positioned below or beneath the screen 2.

In order to permit the easy positioning of the safety drainer on the rim 10 of the pan 9, I prefer to employ a lug 8 which may be in the nature of an inwardly extension or depression of the angular frame 1, or may, as illustrated in the drawings, be a separate member secured to the downwardly extending portion of the angular frame 1 diametrically opposite from the handle 6. The angular frame 1 is cut away as illustrated at 11 so that the safety drainer will fit down firmly on the rim 10 of the pan 9 over the handle 6 thereof. A clamp 3 is secured to the angular frame 1 at this latter point so that the same may be operated in conjunction with the handle 6 of the pan 9 and will grip the pan 9 under the rim 10 thereof. By this construction, I am enabled to position the cover on the pan 9 by first taking hold of the handle 3ª of the clamp 3 and sliding the frame 1 over the rim 10 until the lug 8 engages the rim 10 at the underneath side thereof. The handle 3ª of the clamp 3 is then depressed by holding simultaneously the handle 3ª of the clamp 3 and handle 6 of the pan 9. This rotates the clamp 3 so that the engaging portions 3ᵈ thereof engage under the rim 10 of the pan 9. By merely holding the handle 3ª and the handle 6, the safety drainer will then be securely held in position on the rim 10, no matter what position the pan 9 is turned or rotated to.

The clamp 3 is preferably secured to the frame 1 by means of a pair of spaced upwardly extending ears 4 which are secured to or may be formed integral with the angular frame 1.

The downwardly extending portion of the angular frame 1 prevents lateral displacement of the safety drainer when the same is positioned upon the rim 10.

The handle 3 is preferably of the following construction and is composed of a single portion of wire or like material which is bent to form a handle portion 3ª which terminates in transverse pin sections 3ᵇ which extend through the perforations formed in the ears 4. The pin sections 3ᵇ terminate in downwardly extending portions 3ᶜ which are bent over at their lower ends to provide upwardly extending rim engaging portions 3ᵈ.

Having fully described a preferred embodiment of this invention it is to be understood that I do not wish to be limited to the exact details herein set forth which may obviously be varied without departing from the spirit of my invention as set forth in the appended claims.

I claim:

1. The combination with a pan having a handle, of a safety drainer comprising an angular frame, an inwardly projecting lug at one point on the angular frame and a clamping member pivotally secured to the angular frame at a point diametrically opposed to the said lug and having a handle portion extending over the handle of the said pan.

2. The combination with a pan having a handle, of a safety drainer comprising an angular frame, an inwardly projecting lug at one point on the angular frame and a movable clamp attached to said frame and having a handle portion adapted to co-operate with the handle of said pan.

3. The combination with a pan having a handle, of a safety drainer comprising an angular frame, a wire screen secured to the angular frame, a clamping member pivotally secured to the angular frame, and a handle portion of the said clamping member extending over the handle of the said pan and adapted to be gripped with the handle of the said pan for clamping the safety drainer on the said pan.

4. The combination with a pan having a handle and an upper rim, of a safety drainer comprising an angular frame, a wire screen secured to the angular frame, and a clamping member pivotally secured to the said frame and adapted to be gripped with the handle of the said pan and to engage the said rim.

5. The combination with a pan having an outwardly extending rim at its upper edge, and a handle, of a safety drainer adapted to be detachably secured to the said rim comprising an angular frame of slightly greater diameter than the rim of the said pan, a clamping member pivotally secured to the said frame, and having a handle portion adapted to be gripped with the handle of the said pan to clamp the said safety drainer to the said rim.

6. In a device of the class described, the combination of an angular frame, a wire screen secured to the said frame, an inwardly projecting lug secured at a point on the said frame, the said frame being cut away at a point diametrically opposite the said lug, and a movable clamp attached to the said frame over the cut away portion.

7. The combination with a pan having a handle, of an annular frame formed to the shape of the upper edge of the pan, a circular wire screen secured to the said frame, a clamp pivotally secured to the said frame and having a handle portion adapted to be gripped with the handle of the said pan to clamp the said frame to the pan.

NELLIE E. SHARPNECK.